(12) United States Patent
Cuypers et al.

(10) Patent No.: US 8,181,390 B2
(45) Date of Patent: May 22, 2012

(54) GROWTH SUBSTRATES, THEIR PRODUCTION AND THEIR USE

(75) Inventors: Jean Marie Wilhelmus Cuypers, Linne (NL); Daan De Kubber, Roermond (NL); Paul Bouwens, Vught (NL)

(73) Assignee: Rockwool International A/S, Hedehusene (DK)

( * ) Notice: Subject to any disclaimer, the term of this patent is extended or adjusted under 35 U.S.C. 154(b) by 503 days.

(21) Appl. No.: 12/374,333

(22) PCT Filed: Jul. 20, 2007

(86) PCT No.: PCT/EP2007/006480
§ 371 (c)(1),
(2), (4) Date: Jun. 23, 2009

(87) PCT Pub. No.: WO2008/009467
PCT Pub. Date: Jan. 24, 2008

(65) Prior Publication Data
US 2009/0300985 A1 Dec. 10, 2009

(30) Foreign Application Priority Data

Jul. 20, 2006 (EP) .................................. 06253801

(51) Int. Cl.
*A01G 31/00* (2006.01)
(52) U.S. Cl. ......................................................... 47/59 S
(58) Field of Classification Search .................... 47/59 S
See application file for complete search history.

(56) References Cited

U.S. PATENT DOCUMENTS

| 1,824,430 | A | * | 9/1931 | Hall .............................. 162/145 |
| 3,336,129 | A | | 8/1967 | Herrett et al. |
| 4,174,957 | A | | 11/1979 | Webb et al. |
| 4,240,817 | A | | 12/1980 | Takizawa et al. |
| 4,769,277 | A | | 9/1988 | Meunier |
| 5,009,030 | A | | 4/1991 | Kafka et al. |
| 5,009,031 | A | * | 4/1991 | Knop et al. ........................ 47/64 |
| 5,129,181 | A | * | 7/1992 | Kafka et al. ........................ 47/64 |
| 5,133,151 | A | * | 7/1992 | Blok .................................. 47/64 |
| 6,238,685 | B1 | * | 5/2001 | Hei et al. ....................... 424/405 |
| 2009/0163097 | A1 | * | 6/2009 | Kajander ....................... 442/118 |
| 2009/0300985 | A1 | * | 12/2009 | Cuypers et al. .............. 47/1.1 R |

FOREIGN PATENT DOCUMENTS

| CA | 2301248 | | 9/2000 |
| DE | 4024727 | | 2/1992 |
| DE | 4208733 | | 9/1993 |
| EP | 0201426 | | 12/1986 |
| EP | 310501 | | 4/1989 |
| EP | 313255 | | 4/1989 |
| EP | 0485277 | | 5/1992 |
| EP | 889175 | | 1/1999 |
| EP | 1166624 | A1 * | 1/2002 |
| EP | 1226749 | | 7/2002 |
| EP | 1226749 | A1 * | 7/2002 |
| GB | 1336426 | | 11/1973 |
| GB | 2079286 | | 1/1982 |
| WO | WO8300797 | | 3/1983 |
| WO | WO9204824 | | 4/1992 |
| WO | WO9603858 | | 2/1996 |
| WO | WO9700797 | | 1/1997 |
| WO | WO9707664 | | 3/1997 |
| WO | WO9938372 | | 8/1999 |
| WO | WO 03041487 | | 5/2003 |
| WO | W02008009463 | | 1/2008 |
| WO | WO2008009461 | | 1/2008 |
| WO | WO 2008009462 | | 1/2008 |
| WO | WO2008009467 | | 1/2008 |

* cited by examiner

*Primary Examiner* — Frank T Palo
(74) *Attorney, Agent, or Firm* — McAndrews, Held & Malloy, Ltd.

(57) ABSTRACT

The invention provides a method of growing plants in a mineral wool growth substrate, the method comprises providing at least one mineral wool growth substrate comprising binder and wetting agent, positioning one or more plants for growth in the growth substrate, characterized in that the height of the mineral wool growth substrate is at least 53 mm and the wetting agent comprises ionic surfactant.

20 Claims, No Drawings

GROWTH SUBSTRATES, THEIR PRODUCTION AND THEIR USE

RELATED APPLICATION

This application is a 371 National Phase filing of International Patent Application Serial No. PCT/EP2007/006480 filed Jul. 20, 2007, which claims priority benefit of EP Patent Application Serial No. 06253801.2 filed Jul. 20, 2006. Both applications are incorporated herein by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

The invention relates to methods of growing plants using a mineral wool growth substrate. In the method, the mineral wool growth substrate comprises a binder, often a hydrophobic binder, to provide structural integrity, and a wetting agent which provides water handling characteristics. The invention also relates to the use of specific types of wetting agent to provide particular characteristics to a mineral wool growth substrate.

It has been well known for many years to grow plants in growth substrates formed from mineral wool. Mineral wool products which are provided as a coherent plug, block, slab or mat generally include a binder, usually an organic binder, in order to provide structural integrity to the product and such binders are commonly hydrophobic once cured. This allows the growth substrate to retain its structure during water irrigation, including use for over one year. However, mineral wool products which are to be used as growth substrates must have a capacity to take up and hold water, which is routinely supplied by an irrigation system to the growth substrate, and re-wetting properties. Accordingly, it has been well known for some years to include a wetting agent in mineral wool products which are to be used as growth substrates.

One early example of this is GB-A-1336426, which describes readily wettable mineral wool products suitable for use as growth substrates. To provide structure and shape, the fibers contain a binder such a phenol formaldehyde resin or urea formaldehyde resin. To provide the required water holding characteristics the product also contains a wetting agent, in an amount of up to 2% by wt. based on the mineral wool. General classes of wetting agents are mentioned, such as anionic and cationic wetting agents, but non-ionic wetting agents are said to be preferred. Examples are alkyl polyglycol ethers such as Triton CF10 and Lissapol N. These are said to be especially valuable where the growth substrate must be subjected to elevated temperatures in order to cure the binder, as they retain adequate wetting properties even after being subjected to temperatures of 200° C. or greater. In cases where the wetting agent is not subjected to elevated temperatures, a wider variety of materials is suggested, including lauryl alcohol. Generally the product is said to be in the form of sheets which can have thickness greater than 1 cm. An example is given of slabs of thickness 5 cm containing cured binder and Triton CF10 wetting agent.

Subsequent publications, and the commercial field itself, have generally followed this preferred approach. For instance, EP-A-889175, DE-A-4208733, WO 92/04824 and DE-A-4024727 all describe systems in which a wetting agent/surfactant is included in the mineral wool growth substrate. In these cases, the nature of the wetting agent is either unspecified or is stated to be a non-ionic material, as in GB-A-1336426. In commercial practice levels of up to 3% non-ionic surfactant, by weight based on the growth substrate, are normally used.

WO93/00797 discloses a growing medium said to be advantageous for improving cultivation control in comparison with sphagnum or peat-based products. According to this publication the growing medium comprises mineral fibers and granulated expanded material secured in a three-dimensional matrix with cured binder. The invention of this document requires that the growing medium comprises at least 30% granulated dried clay and from 0.01 to 10% by weight binder. It is stated that this combination of materials reduces the risk of over-watering of the growing medium and improves water retention.

This document also indicates that it is advantageous to cure the product so that a cohesive mineral fiber matrix is obtained, preventing the sedimentation and/or washing out of the added particulate materials.

It is also stated that anionic surfactant may also be included in the growing medium but no particular advantage is associated with the inclusion of the anionic surfactant.

Whilst the inclusion of binder and wetting agent as described in GB-A-1336426 is generally very helpful, it has certain problems. The first is that the water handling capabilities of the substrate, although good, show room for improvement. Thus, it would be desirable to provide systems which show improved re-saturation properties (ability of the growth substrate to take up water a second time once it has been wetted and then dried), improved water distribution properties (ability of the growth substrate to hold water at a more uniform concentration throughout the height of the growth substrate rather than concentrating at the base), and water retention.

Additionally, one problem which tends to arise with the non-ionic surfactants which have conventionally been used is that they are, during irrigation of the growth substrate, gradually lost from the growth substrate rather than being retained in the mineral wool structure. This means that the wettability properties of the growth substrate gradually decrease over time. This can have an impact on, for instance, the re-saturation properties and also on the water handling properties of a substrate which has been in place for a considerable time, and thus on the performance of the plant and growing process.

Accordingly, there have been other attempts in the art to deal with the problem of providing a mineral wool growth substrate which contains binder material to provide structural integrity but which also has appropriate wettability properties. Examples include the publications EP-A-889175, DE-A-4208733, WO 92/04824 and DE-A-4024727 mentioned above, as well as CA-A-2301248, WO 97/07664 and WO 99/38372, which address the problem by providing specific binders which can provide both structural and wettability properties. CA-A-2301248 discloses a substrate which additionally comprises surfactant.

These latter two approaches, whilst having advantages, in particular the advantage that the wetting agent is not lost during irrigation, necessitate the use of a rather specific and potentially expensive binder material. Further, there is still room for improvement in their water handling properties.

In particular, it is a constant aim of the growth substrate industry to provide a growth substrate which has improved water distribution over its height. It is required to achieve a water to air ratio throughout the growth substrate which is as close as possible to optimum. Naturally, when a growth substrate is irrigated with water, there is a tendency for water concentration at the base to be higher, and often significantly higher, than water concentration in the top region, purely due to the influence of gravity. A number of approaches have been made in order to address this problem, including, for instance, U.S. Pat. No. 5,009,030, which modifies the nature of the substrate itself throughout the height of the block of mineral wool growth substrate, in order to provide greater water retention in the top regions of the block of mineral wool substrate.

This is especially problematic in the context of growth substrates of relatively large height.

GB-A-1336426 describes growth substrates having thickness of 5 cm or greater. Growth substrates can have a wide variety of thicknesses or heights. The particular height chosen is dependent upon the application for which the mineral wool growth substrate is intended.

However, there are some applications in which the substrate must have a particular minimum height. These include the propagation phase, mobile plant systems and transplantation processes, as well as products intended for growing plants in containers. In these applications the known systems present particular problems, because the greater the height of the substrate the greater the problems with retaining sufficient amounts of water in the top regions of the substrate.

Accordingly, it is still, despite the many years during which the industry has used mineral wool materials as growth substrates, an aim to provide materials which exhibit excellent water distribution properties and water retention properties, and which maintain these properties over time, during use, and thus can exhibit excellent re-saturation properties. It is also desirable to achieve this in the context of a product which has good structural integrity and can be made in conventional manner.

There is also the continuing problem of appropriate irrigation methods. In general it is conventional to irrigate mineral wool substrates, especially those of relatively large height, from the top using hoses and drippers. This is necessary to avoid the top of the substrate drying out too much. However, it is generally less convenient to have to provide such systems.

EP-A-1226749 discloses a process for the production of water-absorbing mineral fiber products, which can be used for growing plants. According to this process, during production of the fibers, material is applied to the fibers after formation and before collection, comprising binder, wetting agent and aliphatic polyol. The binder can be a conventional phenol-based resin. The polyol can preferably be ethylene glycol, propylene glycol or trimethylolpropane. The wetting agent can be selected from a long list including salts of higher fatty acids, alkyl or aralkyl sulfates or sulfonates, fatty alcohol sulfates, alkyl phosphates, fatty alcohol ethoxylates, alkyl phenol ethoxylates, fatty amine ethoxylates, fatty acid ethoxylates, alkyl ammonium compounds. Alkyl benzene sulfonate is said to be preferred. No reason is given for this preference.

BRIEF SUMMARY OF THE INVENTION

One aspect of the invention is a method of growing plants in a mineral wool growth substrate. At least one mineral wool growth substrate is provided having a height of at least 75 mm and comprising binder and wetting agent. The wetting agent comprises an ionic surfactant. Then one or more plants is positioned for growth in the growth substrate.

Another aspect of the invention is a process of producing a mineral wool growth substrate, including several steps. Solid mineral raw materials are provided and melted to form a melt. The melt is formed into fibers. An ionic surfactant and a binder are applied to the fibers after formation. The fibers are collected as a primary web, which is consolidated after the binder is applied. The primary web is subjected to elevated temperature in order to cure the binder, forming a growth substrate. A growth substrate is formed having a height of at least 75 mm.

Yet another aspect of the invention is another method of growing plants in a mineral wool growth substrate. At least one mineral wool growth substrate is provided having a height of at least 75 mm. The substrate comprises a binder and a wetting agent. The wetting agent comprises an ionic surfactant. One or more plants is positioned for growth in the growth substrate. The growth substrate is irrigated from its base.

BRIEF DESCRIPTION OF THE SEVERAL VIEWS OF THE DRAWING

Not applicable.

DETAILED DESCRIPTION OF THE INVENTION

In a first aspect we provide a method of growing plants in a mineral wool growth substrate, the method comprising:

providing at least one mineral wool growth substrate comprising binder and wetting agent, positioning one or more plants for growth in the growth substrate, characterized in that the height of the mineral wool growth substrate is at least 53 mm and the wetting agent comprises ionic surfactant.

We find that this particular combination of binder and ionic surfactant, especially linear alkyl benzene sulfonate surfactant, provides a surprisingly effective combination of water handling properties. In particular, water handling properties are consistently better in all respects than a combination of binder and conventional non-ionic based wetting agent. They are even better in particular respects than the system of the type described in WO 99/38372 which uses a specific hydrophilic binder system.

Particular benefits are seen in water distribution properties, especially in comparison with this type of hydrophilic binder system, which prior to the invention had provided the highest standard of water distribution. Water distribution properties are especially important when a mineral wool substrate having relatively large height is used, because it is such materials which suffer most from problems of water concentrating in the lower regions of the substrate and there being reduced water concentration in the top region. Furthermore, the choice of ionic, especially anionic, surfactant, especially linear alkyl benzene sulfonate (LAS), appears to lead to greatly reduced loss of wetting agent during irrigation and consequently minimizes foaming problems during the irrigation process. LAS also has the advantage of being aerobically biodegradable in water.

As a result of this recognition of the beneficial properties of ionic surfactants in particular, we also provide, in a second aspect of the invention, the use of an ionic surfactant to improve the water distribution characteristics of a mineral wool growth substrate containing binder. Improvement is shown in particular in comparison with growth substrates containing binder and a conventional wetting agent such as a non-ionic surfactant. Improvements can also be shown in comparison with mineral wool growth substrates which do not contain wetting agents but instead contain a hydrophilic binder system, such as in WO 99/38372. The improvement can be shown either by replacement of a conventional non-ionic wetting agent or by addition of the ionic surfactant to a growth substrate which also contains conventional non-ionic surfactant, but generally is shown by replacement of the conventional wetting agent.

According to a third aspect of the invention, we provide a method of growing plants in a mineral wool growth substrate, the method comprising:

providing at least one mineral wool growth substrate comprising binder and wetting agent, positioning one or more plants for growth in the growth substrate, and irrigating the growth substrate, characterized in that the wetting agent comprises ionic surfactant and the growth substrate is irrigated from its base.

The use of an ionic surfactant allows for irrigation via the base of the substrate due to the much greater ability of ionic surfactants to provide a good water distribution over the height of the substrate in comparison with conventional wetting agents. This generally adds convenience and simplicity to the growing process for the grower.

This method is particularly useful in the case of substrates which have height at least 53 mm and especially when they have the preferred greater heights discussed below in the context of the preferred features of the first aspect of the invention. This is because when a substrate has a large height then irrigation from the base of the substrate is often particularly difficult to operate and to provide appropriate water distribution in the substrate. The use of the invention, whereby the wetting agent comprises ionic surfactant, allows such methods to be carried out effectively.

Thus the invention is particularly useful when irrigation of the substrate is only from its base and no irrigation water is supplied from above the substrate.

The invention provides a number of benefits, in addition to the water distribution properties discussed above. The physical properties of the substrate can be improved, in particular with regard to bending, whilst retaining good properties such as firmness.

Root distribution can be improved, for instance plants can exhibit more roots, and/or the finer roots are better branched and/or the root distribution is improved, whereby there are more roots in the top layer of the substrate.

These beneficial properties can be achieved even where the substrate appears to be wetter.

The growth substrate is formed of mineral wool, which can be glass wool or slag wool but is usually stone wool. In general it can be any of the types of man-made vitreous fiber which are conventionally known for production of growth substrates. Fiber diameter is often in the range 3 to 20 microns, in particular 5 to 10 microns, as conventional.

Density of the block of growth substrate can be up to 200 kg/m$^3$ but is generally in the range 10 to 150 kg/m$^3$, often in the range 30 to 100 kg/m$^3$, preferably in the range 35 to 90 kg/m$^3$. It can be at least 45 kg/m3.

The mineral wool growth substrate comprises a binder, usually an organic binder, which is generally heat-curable. The growth substrate is preferably a coherent matrix of mineral fibers connected by cured binder. The invention is particularly valuable when the binder is an organic hydrophobic binder, and in particular when it is a conventional heat-curable (thermosetting), hydrophobic binder of the type which has been used for many years in mineral wool growth substrates (and other mineral wool based products). This has the advantage of convenience and economy. Thus, the binder is preferably a phenol formaldehyde resin or urea formaldehyde resin, in particular phenol urea formaldehyde (PUF) resin.

The binder is generally present in the mineral wool growth substrate in amounts of from 0.1 to 10% based on the substrate, usually 0.5 to 5%, most preferably 1.5 to 5%.

The mineral wool growth substrate also comprises a wetting agent which is an ionic surfactant.

Preferably it is an anionic surfactant. Suitable anionic surfactants include salts (including, for example, sodium, potassium, ammonium and substituted ammonium salts such as mono-, di- and triethanolamine salts) of the anionic sulfate, sulfonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulfate surfactants and anionic sulfonate surfactants, anionic carboxylate surfactants and anionic soap surfactants.

Particularly preferred are the anionic sulfonate surfactants such as linear or branched alkyl benzene sulfonates, alkyl ester sulfonates, primary or secondary alkyene sulfonates, olefin sulfonates, sulfonated polycarboxylic acids, alkyl glycerol sulfonates, fatty acyl glycerol sulfonates, fatty oleyl glycerol sulfonates and mixtures thereof.

Most preferably the anionic surfactant is a linear alkyl benzene sulfonate in which the alkyl chain has from 5 to 20 carbon atoms. The sodium and potassium salts are preferred. This type of surfactant provides particularly beneficial water distribution properties for growth substrates of relatively large height and also provides excellent re-saturation properties and does not lead to foaming problems in the irrigation water. Conventional non-ionic surfactants allow the growth substrate to take up water but its water retaining capacity is not as good as with the type of surfactant used in the invention.

Preferably the alkyl chain length is in the range 8 to 16, and more preferably at least 90% of the chains are in the range 10 to 13 and more preferably at least 90% (by weight) are in the range 10 to 12.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulfonium compounds. Beanie and sultaine surfactants are examples of zwitterionic surfactants.

The ionic surfactant is present in the growth substrate in amounts preferably from 0.01 to 3% (by weight), based on growth substrate, more preferably 0.05 to 1%, in particular, 0.075 to 0.5%.

Preferably the amount (by weight) of ionic surfactant based on the weight of binder (dry matter) is in the range 0.01 to 5%, preferably 0.5 to 4%.

It is preferred that there is substantially no other wetting agent than the ionic surfactant, and it is particularly preferred that there is substantially no other wetting agent than linear alkyl benzene sulfonate. Thus, levels of such other materials are preferably below 0.1% (by weight) in particular below 0.01%, based on the growth substrate.

The growth substrate may contain other types of conventional additives in addition to binder and wetting agent, for instance salts such as ammonium sulfate and adhesion promoters such as silanes.

In the first aspect of the invention the growth substrate must have a minimum height of at least 53 mm. The height is the vertical dimension when the growth substrate is positioned for use. If the growth substrate has a variable height across its width/length then the minimum height must be at least 53 mm.

The invention is particularly valuable when the minimum height is at least 60 mm. The benefits of the invention are especially noticeable when the height of the substrate is unusually large, especially at least 75 mm. Such substrates have proved in the past very difficult to irrigate in a manner whereby there is advantageous distribution of the water over the height and we find surprisingly that the application of the specific type of surfactant required by the invention allows excellent water distribution over the height to be achieved even for such unusually high substrates. Thus the invention is especially useful for the height of at least 80 or at least 85 mm and at least 100 mm or even at least 120 mm. It may be up to 180 mm or 300 mm.

In the method, plants are positioned in the mineral wool growth substrate for growth. One plant, or more than one, may be positioned in a single unit of mineral wool growth substrate.

The method may be any method of growing plants in a mineral wool substrate in which the substrate has thickness (height) of at least 53 mm. These applications include germination of seedlings, propagation of cuttings, growth of plants in containers, freely planted cultures and sucking beds.

However, it is particularly valuable in, for instance, applications where the growth substrate is used for the propagation phase. For instance, a plant in the propagation phase is kept for a specified number of days (say 50 days) and its vegetation and roots increase in length. After the propagation phase the plant must be moved into a new situation. However, it can be valuable for growers to be able to extend the propagation phase (say to 70 days) but this has the effect that a larger volume, and hence greater height, of mineral wool growth substrate will be required to accommodate the greater root volume. Thus, the invention is particularly valuable in the propagation phase, in particular in the extend phase and at start up after delivery at growers.

It is also valuable in the growing phase when the plants root into the substrate unit, where distribution of water over the height of the unit, is important. This allows achievement of an optimum water to air ratio through the height of the growth substrate, ensuring good rooting-in and good root development (critical for overall plant development).

The distribution of water over height, water retention and re-saturation properties provided by the growth substrate of the invention are particularly valuable in mobile plant systems, single plant systems, single substrate production units and container systems, which require such properties.

Other applications where the growth substrate has a height above 53 mm, often considerably above 53 mm, include growth of plants in a container. Often one to three plants are included in a mass of growth substrate in a single container.

The invention is particularly valuable in circumstances where growers desire to have a particularly high density of plants in a fixed greenhouse area (i.e. the plants must be very close together). Thus, it is in some circumstances desirable to maximize the number of plants growing in a particular available floor area and thus the volume of growth substrate available to those plants over that restricted area needs to be maximized. Since area is fixed, then height needs to be increased. This can in appropriate circumstances be achieved by providing a growth substrate which has a height of, for instance, 80 mm or greater, 100 mm or greater, 120 mm or greater or 160 mm or greater. This allows maintenance of a defined minimum substrate volume per plant but at a fixed surface area and hence fixed length and width of any given block of substrate.

The invention can be useful when plants such as tomatoes, peppers, cucumbers, watermelon, melon or roses are transplanted. The invention is also useful for interplanting—where a new crop is begun whilst an old crop (or part thereof) is still in the greenhouse. This can be part of a crop rotation strategy, especially in tomato and rose. It is usually necessary to retain the same volume of mineral wool growth substrate per plant but when transplantation or interplanting take place the surface area in the horizontal direction is reduced, or the number of plant per unit area is increased. This necessitates a greater height of the product but, in the absence of the invention, can then lead to problems that the top region of the product is inadequately saturated with water.

In all cases, it is a particular benefit of the growth substrates defined that they can be re-used. Thus, in the invention it is also possible to position the plants in a unit of mineral wool growth substrate which has previously been used and wetted and allowed to dry out.

The invention is especially useful when plants are grown in the same substrate for an extended period, for instance at least three weeks, preferably at least three months, more preferably at least six months, especially preferably at least one year.

The growth substrate is in the form of a coherent mass. The mineral wool growth substrate may be in any integral form, for instance in the form of small blocks or plugs, larger blocks, or an extensive mat/slab, provided that the height is as required by the first aspect of the invention. Other dimensions may be selected as convenient. The growth substrate is generally a coherent matrix of mineral wool fibers, which has been produced as such, but can be formed by granulating a slab of mineral wool and consolidating the granulated material.

The mass of growth substrate may have a variety of width and length dimensions, as conventional.

During the method the plants are irrigated with water and nutrients, as is conventional. The use of ionic surfactant has the advantage that loss of the wetting agent to the irrigation water is minimal, allowing for a system in which there is essentially no anti foam material in the irrigation water.

In use we find that the mineral wool growth substrate exhibits a particularly desirable distribution of water over height. This distribution can be determined by comparing the water content at the top of the substrate with the water content at the bottom of the substrate. Each of these values are usually expressed as percentages and the difference between them is preferably less than 45%, more preferably less than 35% and in particular less than 30%.

In some cases the water content may be greater at the top of the substrate, such that the water content difference is expressed as a negative number. It can be up to −10% or more.

This means that non-conventional irrigation methods can be used, specifically in the third aspect of the invention irrigation is from the base of the substrate. Thus, tidal irrigation can be used. A growth substrate can be placed for irrigation in a container passing through gutter. This is also preferred in the first aspect of the invention.

Alternatively, conventional irrigation methods can be used in the first aspect of the invention, although in this aspect also irrigation from the base is preferred.

The mineral wool growth substrate can be made in conventional manner. That is, it is made by providing solid mineral raw materials, melting these raw materials to form a melt and forming the melt into fibers, collecting the fibers as a primary web and consolidating the collected fibers. A binder is, conventionally, usually added by spraying on to the fibers after formation but before collection and consolidation. In the invention the binder is usually a curable binder and is normally cured as the consolidated product passes through a curing oven. After this the product is cut into the desired sizes.

Curing is normally in an oven at a temperature of around 200° C. or greater, often at least 220° C., for instance in the range of 220 to 260° C. Examples of curing temperatures are 225, 240 and 250° C.

Binder is usually applied to the fibers by spraying of a solution of the binder components in finely divided/atomized form.

The wetting agent is also generally applied to the fibers as an atomized/finely divided spray, usually as a solution or dispersion, but can be in neat form if the wetting agent is itself a liquid.

The wetting agent and binder may be applied to the fibers simultaneously or separately. If they are applied simultaneously, this may be as a result of spraying onto the fibers a single liquid composition which comprises both binder components and wetting agent. Such a composition may, for instance, be produced before transport of the composition to the fiber production facility. Alternatively, the materials may be blended at the fiber production facility. As a further alternative they may be blended in-line just before spraying takes place.

Alternatively, the wetting agent and binder components may be applied separately but simultaneously to the fibers.

In general, application is usually by a spray into the spinning chamber into a cloud of the just-formed fibers. This results in distribution of the wetting agent on the surfaces of the fibers.

One particular advantage of using ionic surfactant, in particular anionic surfactant such as LAS, is that it appears to be stable to the curing conditions to which the growth substrate material is normally subject during production. Thus it can be sprayed onto the fibers together with other additives such as binder. Preferably the ionic surfactant is applied to the fibers after they are formed but before they are collected. This is usually by spraying in the spinning chamber. Alternatively, the ionic surfactant can be applied after the fibers are collected as a primary web and before they are consolidated. It is also possible in some circumstances to apply the ionic surfactant after consolidation but before curing and in some cases the ionic surfactant can be applied even after curing.

The binder usually requires further additives, such as ammonia, ammonium sulfate and silane. These can be added to the binder before transport and storage, or at the fiber production facility before storage, or in-line shortly before spraying on of the binder to the fibers.

It is possible to apply a polyol to the fibers together with the wetting agent, as described in EP-1226749. This polyol, if used, can be blended with the wetting agent before transport and storage, or at the fiber production facility. Preferred polyols are ethylene glycol, propylene glycol, and trimethylol propane, especially ethylene glycol.

In general the invention also provides a mineral wool growth substrate comprising hydrophobic binder and wetting agent, whereby the wetting agent comprises ionic surfactant, preferably anionic surfactant. This aspect also provides a method of growing plants comprising providing this substrate and positioning one or more plants for growth in it.

In a further aspect of the invention a novel mineral wool growth substrate has height at least 53 mm and comprises binder and wetting agent, wherein the wetting agent comprises ionic surfactant. Other preferred features of this aspect are those discussed above in connection with the other aspects of the invention.

EXAMPLES

Three growth substrate products were compared, all of height 75 mm. One contains hydrophobic binder and non-ionic surfactant (product A). Another contains a hydrophilic binder and no wetting agent (product B). The third (product C) is a product for use in the invention and contains 3% hydrophobic binder and 0.15% linear alkyl benzene sulfonate anionic surfactant (weight percentages based on growth substrate).

Properties of the products were as follows:

|  | Product A | Product B | Product C |
|---|---|---|---|
| Density (kg/m$^3$) | 46 | 45 | 46 |
| Ignition Loss (%) | 2.8 | 2.6 | 2.8 |
| Initial Saturation (%; V\V) | 83 | 90 | 89 |
| WC-10 cm (%; V\V) | 38 | 67 | 69 |
| Re-Saturation (50%; + 5 mm: % V\V) | 58 | 64 | 66 |
| WC Top (%) | 26 | 32 | 30 |
| WC Bottom (%) | 70 | 60 | 59 |
| WC Top-Bottom (%) | 44 | 28 | 29 |

The various properties were measured as follows:
Initial Saturation.

The sample is weighed dry and its dimensions in dry form also measured.

The sample of substrate is saturated with water by putting the sample on the water surface and letting the sample soak itself with water.

When it is lying at the bottom of the water container, the sample is removed gently and is put on a grid for draining.

After 30 minutes of draining the sample with the water is weighed. Based upon the measured weight dry and the measured dimensions of the sample, the initial saturation is calculated on a volume basis.

For each measurement, 5 samples are taken from a batch.
Water Retention.

The method is described in EP-A-310501.

In principle, the samples are saturated with water and are then put on a sand bed.

Using as a reference the middle of the sample, the sample is then put via the sand bed on an under pressure of 10 cm water column.

After 4 hours, the sample is taken from the sand bed and weighed. On basis of the measured dry and wet weight and the measured dimensions of the samples, the water content on volume basis is calculated.
Water Distribution Over Height The samples are saturated with water and then drained until the samples have a total water content of 50% i 2%. Then the water content is measured at different heights of the samples with a water content meter.

Re-Saturation.

Samples are saturated with water and then drained until the samples have a total water content of 50%+/−2%. Then the samples are placed in a container in which the height of the water is 5 mm. After 4 hours the samples are taken out of the container and weighed.

The weight after 4 hours is measured and this result together with the dimensions of the sample gives a water content on volume basis after 4 hours. This is then a measure for the re-saturation capacity.

It can be seen that Product C in use in to the invention had initial saturation, water retention and re-saturation, as well as water distribution characteristics, equally as good as the more expensive Product B containing hydrophilic binder and consistently improved in comparison with the standard Product A comprising non-ionic surfactant.

The invention claimed is:

1. A method of growing plants in a mineral wool growth substrate, the method comprising:
   providing at least one mineral wool growth substrate having a height of at least 75 mm and comprising binder and wetting agent, in which the wetting agent comprises ionic surfactant, and
   positioning one or more plants for growth in the growth substrate.

2. A method according to claim 1 in which the wetting agent comprises anionic surfactant.

3. A method according to claim 2 in which the wetting agent comprises linear alkyl benzene sulfonate anionic surfactant.

4. A method according to claim 1 in which the mineral wool growth substrate comprises no wetting agent other than the ionic surfactant.

5. A method according to claim 1 in which the amount of ionic surfactant is 0.01 to 3% by weight based on weight of the mineral wool growth substrate.

6. A method according to claim 1 in which the height of the mineral wool growth substrate is at least 85 mm.

7. A method according to claim 1 in which the height of the mineral wool growth substrate is at least 100 mm.

8. A method according to claim 1 in which the binder is a hydrophobic organic binder.

9. A method according to claim 1 in which the plants are irrigated with irrigation water and the irrigation water contains no anti foam material.

10. A method according to claim 1 in which the method is a propagation method.

11. A method according to claim 1 in which the plants are positioned in the mineral wool growth substrate after transplantation from another mineral wool growth substrate.

12. A method according to claim 1 in which the binder is hydrophobic and the ionic surfactant is present in an amount effective to improve the water distribution characteristics of the mineral wool growth substrate containing the hydrophobic binder.

13. The method according to claim 12 in which the ionic surfactant is an anionic surfactant.

14. A method according to claim 1 in which the amount of ionic surfactant is 0.05 to 0.5% by weight based on weight of the mineral wool growth substrate.

15. A method according to claim 1 in which the height of the mineral wool growth substrate is at least 85 mm.

16. A method according to claim 1 in which the height of the mineral wool growth substrate is at least 100 mm.

17. A method according to claim 1 in which the height of the mineral wool growth substrate is 100 to 150 mm.

18. A process of producing a mineral wool growth substrate comprising: providing solid mineral raw materials, melting the raw materials to form a melt, forming the melt into fibers, collecting the fibers as a primary web, consolidating the primary web, applying binder to the fibers after formation and before consolidation, subjecting the primary web to elevated temperature in order to cure the binder, and forming a growth substrate having height at least 75 mm, wherein the process comprises applying ionic surfactant to the fibers after formation.

19. A method of growing plants in a mineral wool growth substrate, the method comprising:
   providing at least one mineral wool growth substrate having a height of at least 75 mm comprising binder and wetting agent, the wetting agent comprising ionic surfactant,
   positioning one or more plants for growth in the growth substrate, and
   irrigating the growth substrate from its base.

20. A growth substrate comprising mineral wool, hydrophobic binder and wetting agent comprising ionic surfactant, the growth substrate having a height of at least 100 mm.

* * * * *